No. 802,967. PATENTED OCT. 31, 1905.
H. P. BROWN.
METHOD OF BONDING ELECTRIC CONDUCTORS.
APPLICATION FILED JAN. 3, 1905.

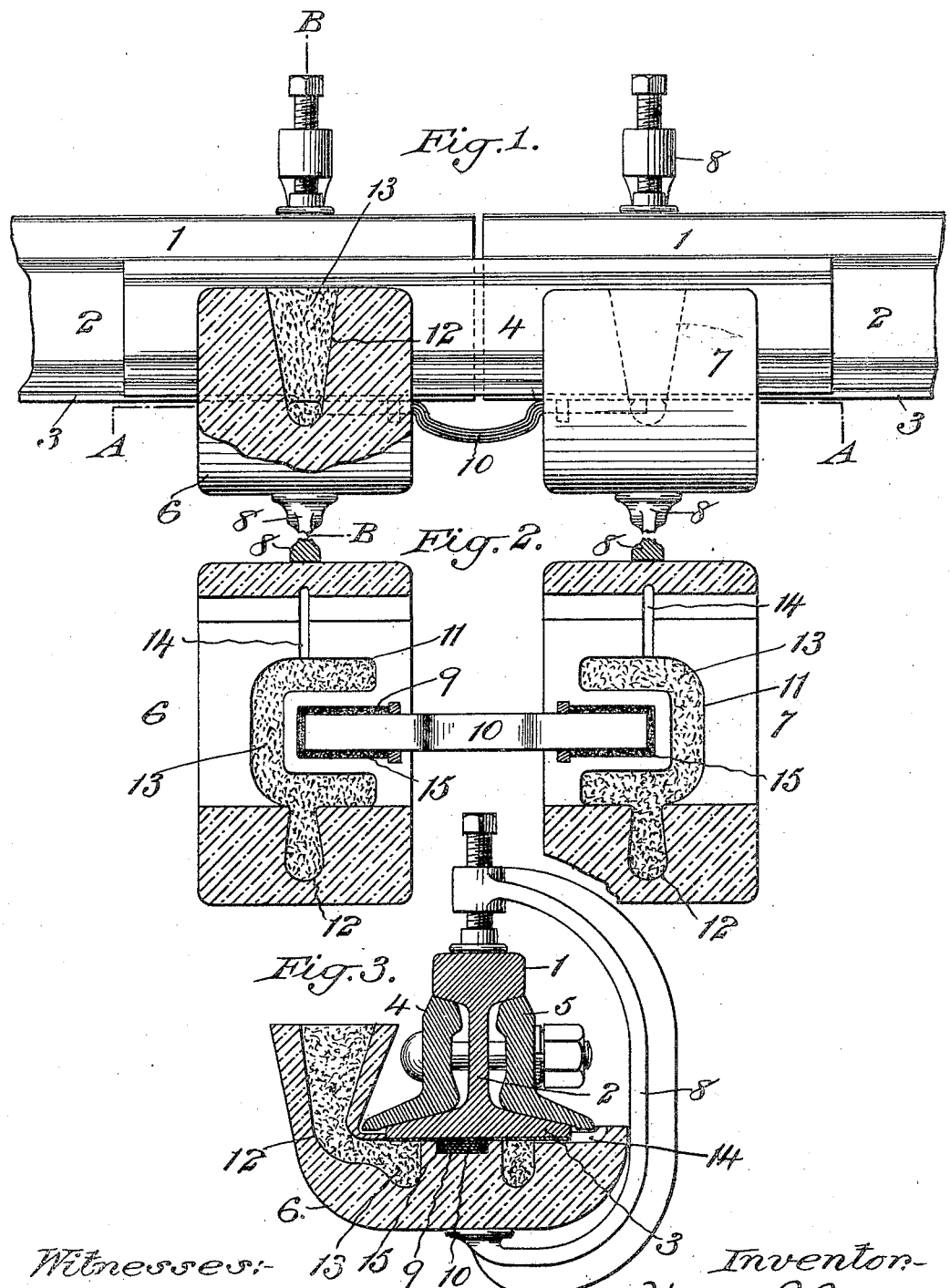

2 SHEETS—SHEET 2.

Witnesses:
F. George Barry,
Henry Thieme

Inventor:
Harold P. Brown
By Brown & Ewart
his Attorneys

UNITED STATES PATENT OFFICE.

HAROLD P. BROWN, OF MONTCLAIR, NEW JERSEY.

METHOD OF BONDING ELECTRIC CONDUCTORS.

No. 802,967. Specification of Letters Patent. Patented Oct. 31, 1905.

Application filed January 3, 1905. Serial No. 239,296.

*To all whom it may concern:*

Be it known that I, HAROLD P. BROWN, a citizen of the United States, and a resident of Montclair, in the county of Essex and State of New Jersey, have invented a new and useful Method of Bonding Electric Conductors, of which the following is a specification.

My invention relates to a method of bonding electric conductors, with the object in view of providing connections between the bond and conductors which shall be strong, durable, and of high electric conductivity and which may be made at a reasonable cost.

With these ends in view my invention consists in preparing the surfaces to be united for soldering or brazing, placing the bond in the proper relation to the surface to which it is to be united, and supplying heat for making the connection by chemical reaction.

To illustrate a practical application of my method, I have chosen the bonding of railway-rails to make them a continuous electric conductor and also the bonding of a cable.

Figure 4:
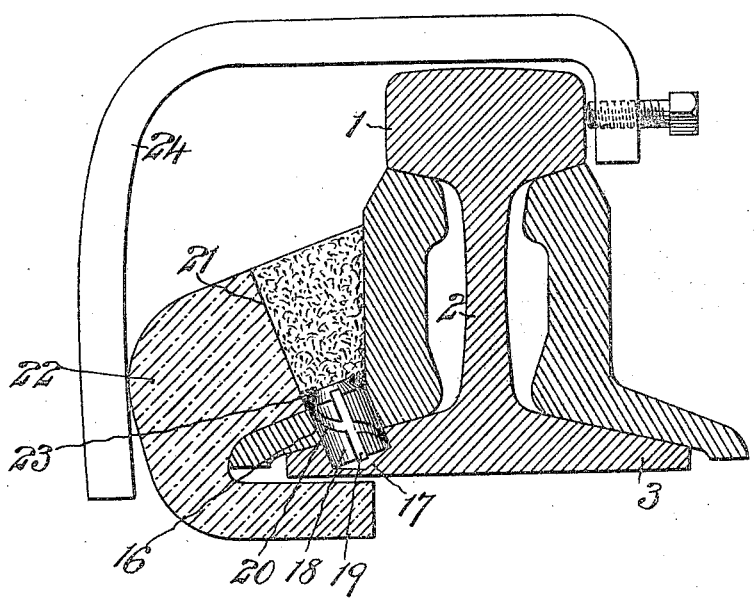
Figure 5:
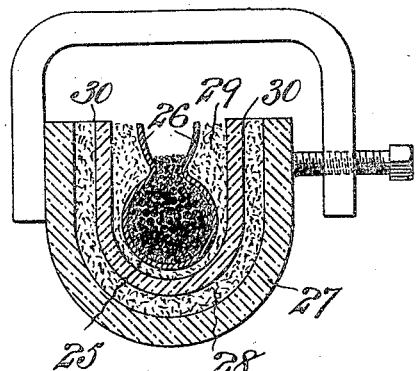

In the accompanying drawings, Figure 1 is a view in side elevation, partly broken away, of the adjacent ends of two rails with angle-plate, bond, and receptacle for the heat-producing material in position. Fig. 2 is a horizontal section through the apparatus in the plane of the line A A of Fig. 1. Fig. 3 is a transverse section in the plane of the line B B of Fig. 1. Fig. 4 is a similar section showing a modified form of apparatus for use in connection with a plug-bond, and Fig. 5 is a similar section showing a modified form of apparatus for use in bonding a cable.

The head of the rail is denoted by 1, the web by 2, and the base by 3. The angle-plates are denoted by 4 and 5.

Referring to Figs. 1, 2, and 3, which represent means for connecting the bond with the under sides of the rail-bases, two similar receptacles 6 and 7 are employed, one for each rail, the receptacle extending from a point above the base of the rail down and underneath the base and held in position by a clamp 8. The part of the receptacle below the base is provided with a recess 9 for the reception of the end of the bond 10 to be brazed or soldered to the rail and with a chamber 11 for the reception of the heat-producing material, the said chamber 11 being separated from the recess 9 by a thin wall and in communication with a funnel-shaped mouth 12 in the upright part of the receptacle. The mouth 12 and a portion or the whole of the chamber 11 is supplied with a heat-producing powder 13. This powder may be composed of pulverized iron oxid or other metallic compounds containing oxygen, sulfur, or chlorin with pulverized aluminium or other similar metals or other compound in which chemical reaction produces heat—for example, what is known in the art as "thermit." The receptacle is further provided with a vent 14, so that the molten product resulting from the ignition of the heat-producing material may flow freely through the chamber 11 around the end of the bond 10. The recess 9, in which the end of the bond is held, is supplied with bits of solder 15, which become melted by the intense heat produced by the chemical reaction which takes place upon the ignition of the heat-producing material in the chamber 11, and this heat is also sufficient to raise the surfaces to be united to a suitable temperature for brazing or soldering. By turning the screw in the clamp the bond may be forced snugly against the base of the rail as the solder melts, thereby producing a strong and efficient connection. Before the bond is placed in the proper position for brazing or soldering the surfaces to be connected should be prepared for soldering by removing the scale and surface rust and by the use of an alkaline amalgam—for example, what is known in the trade as "Edison solid alloy."

In Fig. 4, where a form of bond is employed, which for convenience may be called a "plug-bond," there will be at least two plugs for each angle-plate which is to be electrically connected to the rails, one connecting the angle-plate with one rail and the other connecting the angle-plate with another rail. In this form a hole 16 is made through the angle-plate, and a corresponding socket 17 is formed in the top of the rail-base 3, the hole and the socket being made to register and receive a plug-bond 18, preferably of copper, with a close fit. The exterior of the plug 18 is provided with one or more grooves, in the present instance with one or more longitudinal grooves 19 and with one or more winding grooves 20, the said grooves being open at their upper ends to the bottom of a chamber 21, formed in a receptacle 22. The top of the plug 18 is preferably extended a short distance into the chamber 21 in a reduced form, as shown at 23. The receptacle 22, as well as the receptacles 6 and 7, hereinbefore described, may be made of cast-iron and is intended to rest with its upper end snugly against the outer face of the upright portion of the angle-plate and to follow the base of the angle-plate and finally curve under the base of the rail, in which position it is held by a clamp 24 of any approved form. The chamber 21 may be formed by making a U-shaped recess in the upper end of the receptacle 22 and use the angle-plate to complete the wall of the chamber. Around the reduced top of the plug 18 in the bottom of the chamber 21 bits of solder are placed, and above the solder, within the chamber 21, I place the heat-producing powder—such, for example, as already referred to. The chamber 21 is made taper to enable the free removal of the slag and metal resulting from the chemical reaction, or the metal resulting from the reaction may be left in position to seal and protect the top of the plug. As in the instance already described, the surfaces should be prepared for soldering before igniting the heat-producing material. The wall of the chamber 21 may be protected in any well-known or approved manner, and the receptacle may be made of fire-clay, as is common in the construction of molds, if so desired.

In the form shown in Fig. 5 the cable, composed of copper strands, is denoted by 25, a copper sheath spaced from and surrounding the cable is denoted by 26, and the receptacle for the reception of the heat-producing powder is denoted by 27. The receptacle 27 is U-shaped and has a continuous chamber 28 formed therein, in which the thermit or other heat-producing powder is placed. Between the receptacle 27 and the copper sheath 26 there is a space filled with heat-conducting sand 29, and between the sheath 26 and the cable 25 the solder is placed. The receptacle 27 is made in two sections, being separable along the line 30 to remove the metal and slag resulting from the reaction. These are but three of many forms to which the invention is applicable and in all of which the chemical reaction produces heat sufficiently intense to raise the surfaces of the parts to the required temperature for brazing or soldering and also melts the solder and forms a strong connection and one that will insure high electrical conductivity.

What I claim is—

1. The method of bonding electric conductors consisting in preparing the surfaces for brazing or soldering, placing the bond in the proper relation to the surface to which it is to be united and supplying heat to make the connection by flameless chemical reaction.

2. The method of bonding electric conductors consisting in preparing the surfaces for brazing or soldering, placing the bond in the proper relation to the surface to which it is to be united and supplying heat to make the connection by flameless chemical reaction taking place at a distance apart from the surfaces to be united.

3. The method of bonding electric conductors consisting in preparing the surfaces for brazing or soldering, placing the bond in the proper relation to the surface to which it is to be united and supplying heat to make the connection by chemical reaction of non-gaseous substances.

4. The method of bonding electric conductors consisting in preparing the surfaces for brazing or soldering, placing the bond in the proper relation to the surface to which it is to be united and supplying heat to make the connection by chemical reaction between solids.

In testimony that I claim the foregoing as my invention I have signed my name, in presence of two witnesses, this 30th day of December, 1904.

HAROLD P. BROWN.

Witnesses:
 FREDK. HAYNES,
 C. S. SUNDGREN.